United States Patent [19]

Ito et al.

[11] Patent Number: 5,896,137
[45] Date of Patent: Apr. 20, 1999

[54] IMAGE PROCESSING APPARATUS HAVING STORAGE AREA FOR EFFICIENTLY STORING TWO-VALUE AND MULTI-VALUE IMAGE DATA

[75] Inventors: Akihiro Ito; Koji Aikawa, both of Ebina, Japan

[73] Assignee: Fuji Xerox, Co., Ltd., Tokyo, Japan

[21] Appl. No.: 08/600,045

[22] Filed: Feb. 12, 1996

[30] Foreign Application Priority Data

Feb. 15, 1995 [JP] Japan ................................. 7-026890

[51] Int. Cl.$^6$ ................................. G06T 3/00
[52] U.S. Cl. .............................. 345/433; 345/437
[58] Field of Search ........................ 395/128, 118, 395/523, 130, 133, 137, 139, 167, 524, 525; 345/418, 428, 430, 433, 437, 439, 523–525

[56] References Cited

U.S. PATENT DOCUMENTS

| 5,231,694 | 7/1993 | Novak Mark F. et al. | 395/523 |
| 5,386,509 | 1/1995 | Suzuki et al. | 395/523 |
| 5,491,769 | 2/1996 | Moller | 345/439 |
| 5,600,761 | 2/1997 | Ng et al. | 395/118 |

FOREIGN PATENT DOCUMENTS

| A-63-59674 | 3/1988 | Japan. |
| A-63-102469 | 5/1988 | Japan. |
| A-64-18368 | 1/1989 | Japan. |

*Primary Examiner*—Almis R. Jankus
*Attorney, Agent, or Firm*—Oliff & Berridge, PLC

[57] ABSTRACT

An average calculating section calculates an average of nine pixel values of each pixel block. With an assumption that the average value is expressed by 9 bits as $a_1a_2a_3a_4a_5a_6a_7a_8a_9$ ($a_k$: 1-bit value), a data allocating section allocates the respective bits $a_1$–$a_9$ to 3×3 bits of each memory block of a two-value data storing section. After the nine bits $a_1$–$a_9$ are read out from the two-value data storing section, a data reconstructing section combines those nine bits into the original average value, and repeatedly copies the average value to form a 3×3 pixel block.

9 Claims, 5 Drawing Sheets

| a1 | a2 | a3 |
|----|----|----|
| a4 | a5 | a6 |
| a7 | a8 | a9 |

| a1 | a2 | a3 |
|----|----|----|
| a4 | a5 | a6 |
| a7 | a8 | F2 |

IMAGE PROCESSING APPARATUS HAVING STORAGE AREA FOR EFFICIENTLY STORING TWO-VALUE AND MULTI-VALUE IMAGE DATA

BACKGROUND OF THE INVENTION

1. Field of the Invention

The present invention relates to an image processing apparatus capable of reproducing a smooth halftone image while efficiently using the storage area.

2. Description of the Related Art

As is well known, in storing multi-value image data, it is binarized to reduce its data amount to thereby efficiently use the storage area. However, the binarization deteriorates the image quality. This is remarkable particularly in a halftone image. Conventionally, to minimize the image quality deterioration of a halftone image in reducing the data amount, various types of quasi-halftone processing such as the dither method and the error diffusion method have been used.

For example, Japanese Unexamined Patent Publication No. Sho. 64-18368 discloses an improved version of the density pattern method. Japanese Unexamined Patent Publication No. Sho. 63-102469 a technique in which image data is stored with its resolution reduced to 1/N, and an image is reproduced after the resolution is increased by linear interpolation by a factor of M.

However, in the technique of the publication Sho. 64-18368, when the amount of image data is reduced to a level comparable with that of two-value image data, the image quality of a halftone image is deteriorated. In the technique of the publication Sho. 63-102469, the definition of a resultant image is decreased, so that the quality of an image constituted of characters or a line drawing is deteriorated.

Which of the resolution and the number of gradation levels is more important than the other to keep a satisfactory image quality depends on the nature of an image to be processed. For example, because of its nature, it is desirable that an image containing characters or a line drawing be reproduced finely. Therefore, importance is attached to the resolution, while the number of gradation levels is considered less important. On the other hand, for an image constituted of a photograph or a picture, it is desirable, because of its nature, to reproduce a smooth halftone image. Therefore, the number of gradation levels is considered more important than the resolution.

A technique for accommodating such a difference in the nature of images is disclosed in Japanese Unexamined Patent Publication No. Sho. 63-59674. In this technique, an input image is subjected to area discrimination. Area information as a result of the area discrimination, binarized image information, and resolution-converted multi-value image information are stored, and an image is outputted while switching is made between the two-value image information and the multi-value image information in accordance with the area information.

However, the technique of the publication Sho. 63-59674 is deficient in that a large-capacity storage device is needed to secure separate storage areas for the two-value image information and the multi-value image information.

SUMMARY OF THE INVENTION

The present invention has been made in the above circumstances, and has an object of providing an image processing apparatus which can reproduce a smooth halftone image while efficiently using the storage area by using a storage area for two-value image data to store multi-value image data.

Another object of the invention is to provide an image processing apparatus which can select, in accordance with the nature of an image, between an image reproduction mode in which preference is given to the resolution over the number of gradation levels and another image reproduction mode in which preference is given to the number of gradation levels over the resolution, while efficiently using the storage area by sharing it between two-value image data and multi-value image data.

The invention is also intended to extend the above concept of selective storage between two-value image data and multi-value image data to that between M-bit image data ($1 \leq M$) and N-bit image data (M<N).

According to the invention, there is provided an image processing apparatus comprising:

block processing means for dividing image data expressed in N bits ($2 \leq N$) into pixel blocks each consisting of m×n pixels ($2 \leq m$, $1 \leq n$), calculating a representative value of pixel values that constitute each of the pixel blocks, and outputting the representative value in the form of bit-train data of p bits ($2 \leq p \leq m \times n \times M$);

storing means for storing image data expressed in M bits (M<N);

block allocating means for imaginarily dividing a storage area of the storing means into memory blocks each consisting of m×n pixels, allocating the bit-train data of p bits of the representative value to bits that constitute each of the memory blocks, and outputting resulting bit-train data;

writing means for writing the bit-train data that is outputted from the block allocating means to the storing means;

reading means for sequentially reading M-bit-value data from the storing means, and outputting resulting bit-train data; and block reconstructing means for reconstructing p-bit-value image data of m×n representative values having the same value from the bit-train data outputted from the reading means.

DESCRIPTION OF THE PREFERRED EMBODIMENTS

Preferred embodiments of the present invention will be described with reference to the accompanying drawings.

Embodiment 1

Figure 1:
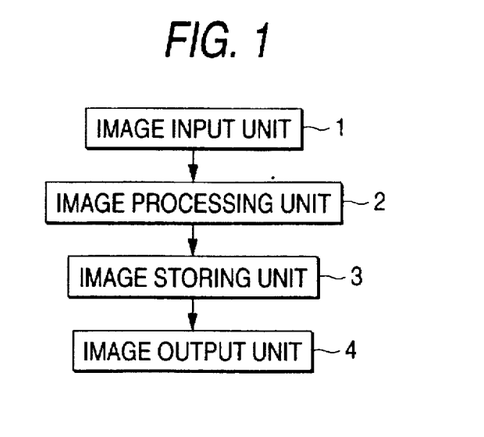
FIG. 1 is a block diagram showing the overall configuration of an image processing apparatus according to a first embodiment of the present invention.

FIG. 1 is a block diagram showing the overall construction of an image processing apparatus according to a first embodiment of the invention. The image processing apparatus of this embodiment is a copying machine that reads an image optically and reproduces it in an electrophotographic manner.

In FIG. 1, an image input unit 1 reads an image with a CCD sensor or the like, and outputs it in the form of multi-value digital image data (8 bits, i.e., 256 gradation levels). An image processing unit 2 performs various types of image processing such as enlargement/reduction, sharpening, smoothing, and gradation correction on the image data supplied from the image input unit 1.

An image storing unit 3 temporarily stores the image data that has been processed by the image processing unit 2. The image storing unit 3 is adapted to selectively operate in one of two modes, i.e., a character-preferential mode and a photograph-preferential mode. In the character-preferential mode, to finely reproduce characters, a line drawing, or the like, image data is stored so that its gradations are lost while its resolution is maintained. On the other hand, in the photograph-preferential mode, to smoothly reproduce a half-tone image such as a photograph, a picture, or the like, image data is stored so that its resolution is somewhat degraded while its gradations are maintained. The selection between the two modes is made by an operator who manipulates a mode selection switch of an input operation unit (not shown). Details of the image storing unit 3 will be described below.

An image output unit 4 produces an image based on image data supplied from the image storing unit 3 in an electrophotographic manner, for instance.

Figure 2:
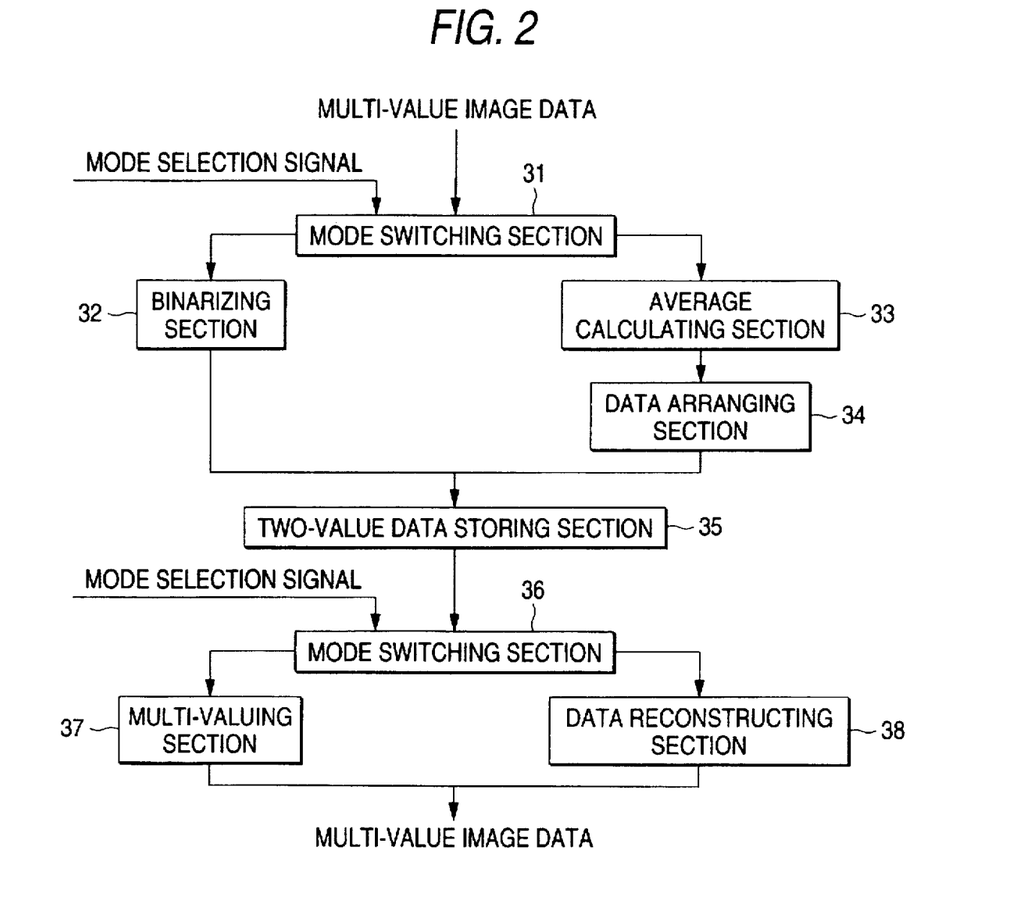
FIG. 2 is a block diagram showing a configuration of an image storing unit of the image processing apparatus of FIG. 1.

The construction of the image storing unit 3 will be described with reference to a block diagram of FIG. 2. In the figure, a mode switching section 31 directs 8-bit multi-value image data, which comes from the image processing unit 2 (see FIG. 1), to a binarizing section 32 or an average calculating section 33 in accordance with a mode selection signal that is supplied in response to manipulation of the above-mentioned mode selection switch. Specifically, the mode switching section 31 supplies the image data to the binarizing section 32 when the character-preferential mode is selected, and to the average calculating section 33 when the photograph-preferential mode is selected.

The binarizing section 32 binaries the incoming multi-value image data, and outputs resultant two-value image data. The two-value image data is written to a two-value data storing section 35 by a writing means (not shown). For example, the binarizing section 32 performs simple binarization in which respective pixel values (256-gradation values) are compared with a given threshold, and converted into "1" when the pixel value is larger than the threshold, and into "0" when it is smaller than the threshold.

The average calculating section 33 divides the incoming multi-value image data into pixel blocks of 3×3 dots, and calculates an average of nine pixel values of each pixel block. The section 33 supplies the calculated average as a representative value (256-gradation value) of each pixel block to a data arranging section 34.

The data arranging section 34 virtually divides the storage area of the two-value data storing section 35 into memory blocks of 3×3 bits, allocates the bits that form a representative value of each pixel block supplied from the average calculating section 33 to the bits that constitute each memory block, and outputs resultant bit-train data. The bit-train data is written to the two-value data storing section 35 by the same writing means as two-value image data. Since the representative value is a 256-gradation value, its constituent bits may be allocated to eight bits of the nine bits that constitute each memory block. To express the representative value to some decimal places, all 9 bits are used.

A mode switching section 36 directs bit-train data as read out from the two-value data storing section 35 by a reading means (not shown) to a multi-valuing section 37 or a data reconstructing section 38 in accordance with the above-mentioned mode selection signal. Specifically, the mode switching section 36 supplies readout bit-train data to the multi-valuing section 37 if the character-preferential mode is selected, to the data reconstructing section 38 if the photograph-preferential mode is selected.

The multi-valuing section 37 converts bit-train data (two-value image data) that are sequentially supplied from the mode switching section 36 into multi-value image data, and supplies those data to the image output unit 4 (see FIG. 1). A well-known multi-valuing algorithm may be used for this multi-valuing operation.

The data reconstructing section 38 reconstructs numerical data of average values of respective memory blocks based on the bit-train data that are sequentially supplied from the mode switching section 36, and outputs the numerical data as representative values of the memory blocks to the image output unit 4 (see FIG. 1).

Figure 3:
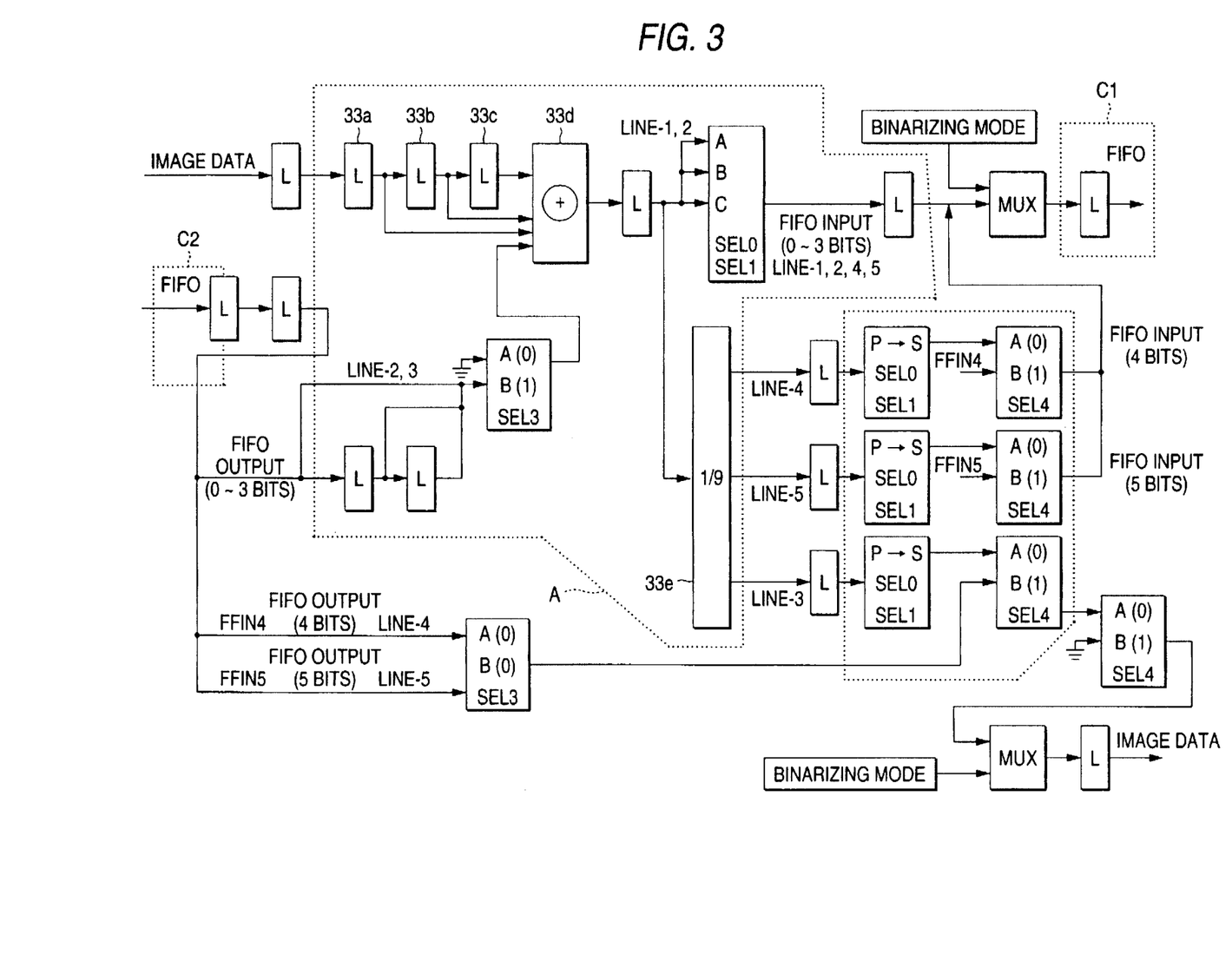
FIG. 3 is a block diagram showing an average calculating section and a data arranging section of the image processing apparatus of FIG. 1.

Next, referring to a block diagram of FIG. 3, an example of a configuration of the above-mentioned average calculating section 33 and data arranging section 34 will be described. In the figure, the average calculating section 33 includes a circuit section A. The circuit section A calculates an average of pixel values of each 3×3 block such that data of the block pixels are added together by an adder 33d while being delayed by latch circuits 33a–33c and a FIFO, and a resultant sum value is divided by 9 by a divider 33e. The data allocating section 34 includes circuit sections B, C1 and C2. In the circuit section B, the average value supplied in units of 3 bits from the divider 33e via latch circuits are subjected to parallel-to-serial conversion, and data of 6 bits are forwarded to the circuit sections C1 and C2, where they are delayed by one line or two lines. In this way, the average value of 9 bits is allocated to the 3×3 block.

Next, the operation of the image processing apparatus thus constructed will be described separately for the character-preferential mode and the photograph-preferential mode.

First, in the character-preferential mode, multi-value image data that is outputted from the image input unit 1 is supplied to the image storing unit 3 through the image processing unit 2. In the image storing unit 3, the multi-value image data is directed to the binarizing section 32 by the mode switching section 31. The multi-value image data is converted into two-value image data by the binarizing section 32, and temporarily stored in the two-value data storing section 35. The two-value image data is read out from the storing section 35 by the reading means, and directed to the multi-valuing section 37 by the mode switching section 36, where it is converted into multi-value image data. The multi-value image data is forwarded to the image output unit 4, which produces an image in an electrophotographic manner, for instance.

As described above, in the character-preferential mode which is intended for characters, a line drawing, and the like in which the gradations are less important, incoming multi-value image data is temporarily converted into two-value image data of a smaller data amount, and returned to multi-value image data before image outputting.

Next, the operation of the image processing apparatus in the photograph-preferential mode will be described. In this mode, multi-value image data received by the image storing unit 3 is directed to the average calculating section 33 by the mode switching section 31. In the average calculating section 33, an average value (i.e., representative value) of nine pixel values is calculated for each pixel block.

Figure 4:
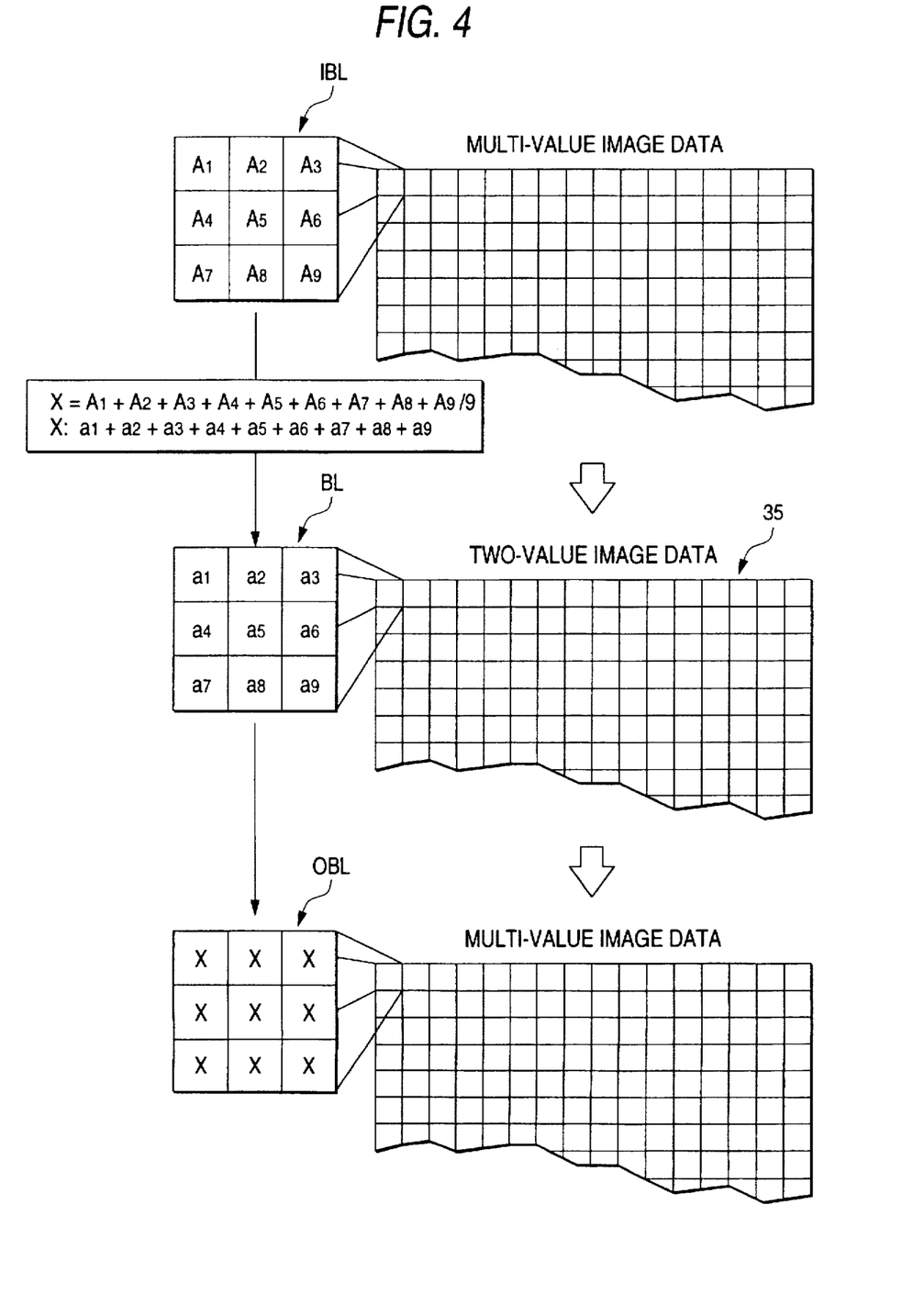
FIG. 4 illustrates the operation of the image processing apparatus of FIG. 1.

For example, where one block IBL of input image data consists of nine pixels $A_1$–$A_9$ as shown in FIG. 4, an average value X is calculated according to Equation (1).

$$X=(A_1+A_2+ \ldots +A_9)/9 \tag{1}$$

Assuming that the average value X is expressed by 9 bits as $a_1a_2a_3a_4a_5a_6a_7a_8a_9$ ($a_k$: 1-bit value, i.e., 0 or 1), the respective bits $a_1$–$a_9$ of the average value X are allocated, as shown, to a 3×3 memory block BL of the two-value data storing section 35 by the data arranging section 34. Thus, the one average value X, which is multi-value image data, is written to the 3×3 memory block BL of the two-value data storing section 35.

An average value X, which is stored in each memory block of the two-value data storing section 35, is read out from the storing section 35 by the reading means in the same manner as in the case of reading out two-value image data. Therefore, a bit train as read out does not properly represent the average value X. However, the bits are rearranged by the data reconstructing section 38 into a bit train that represents an average value X of each pixel block. The average value X is repeatedly copied until one-block data (9 (=3×3) pixels) is formed, and resulting data are forwarded to the image output unit 4, which in turn outputs those data in the form of an image. As a result, an output image is such that the values of 9 (=3×3) adjacent pixels OBL are equal to an average value X of the corresponding pixel block IBL of the input image data.

Thus, in the photograph-preferential mode that is intended for a photograph, a picture, and the like for which it is desirable to reproduce a halftone image smoothly even if its resolution is somewhat degraded, the gradations of input multi-value image data are kept as the average values X of the respective 3×3 pixel blocks while the resolution is reduced to ⅓.

Embodiment 2

An image processing apparatus according to a second embodiment of the invention will be described. Since the overall construction of the image processing apparatus of this embodiment is the same as that shown in FIG. 1, a description therefor is omitted. In this embodiment, in reproducing an image containing both characters and a photograph (or picture), discrimination is made between character data or photograph (picture) data for each given region or block of image data, to generate a discrimination flag. Switching between the character-preferential mode and the photograph-preferential mode is made automatically in accordance with a result of reference to the identification flag. With this configuration, an image can be reproduced such that for the same image data, a character portion is reproduced at high resolution and a photograph (picture) portion is so reproduced that its gradations are maintained.

Figure 5:
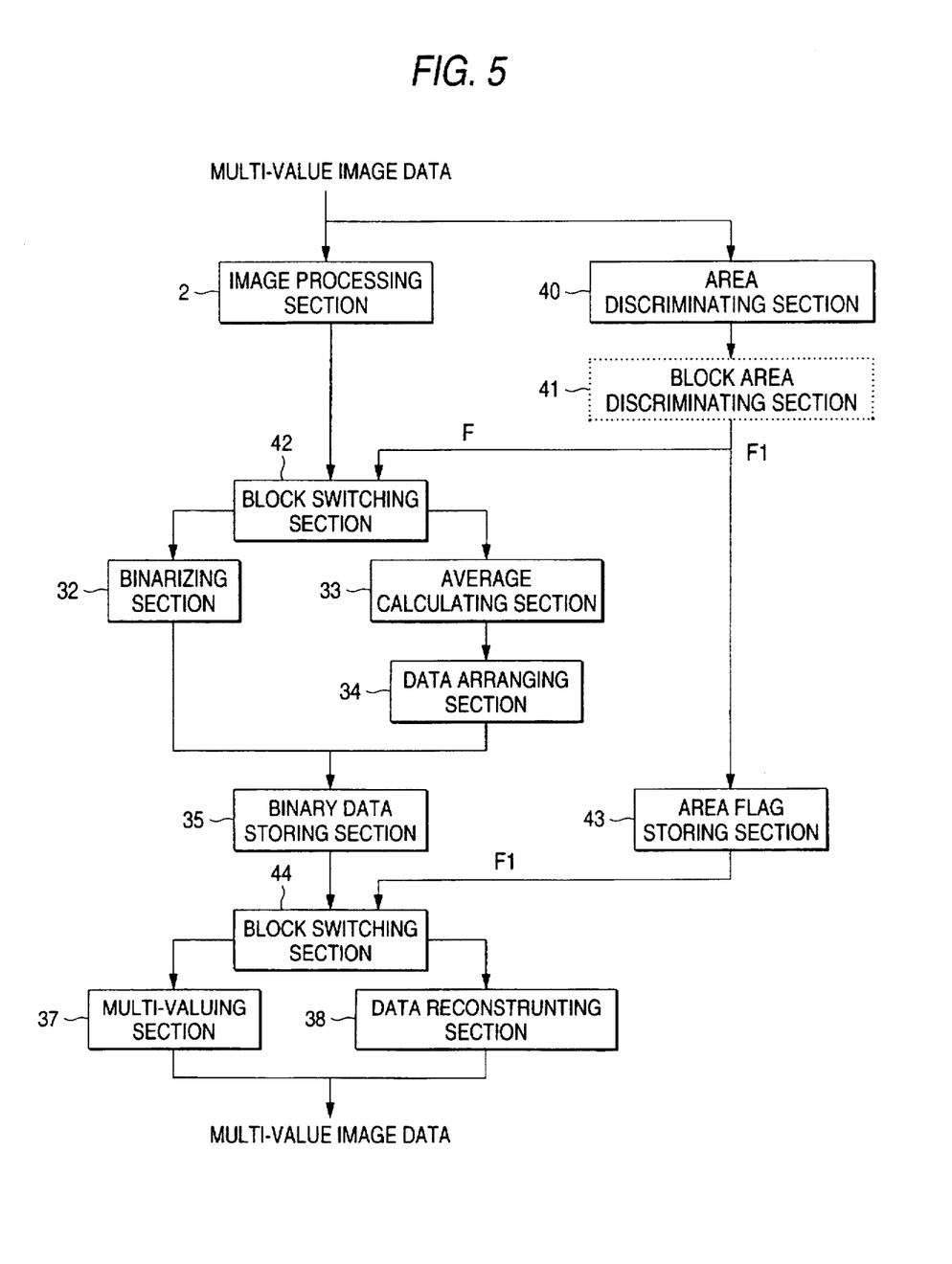
FIG. 5 is a block diagram showing a configuration of an image storing unit of an image processing apparatus according to a second embodiment of the invention.

FIG. 5 is a block diagram showing the construction of an image storing unit 3 of the image processing apparatus according to the second embodiment. The sections in FIG. 5 corresponding to those in FIG. 2 are designated by the same reference numerals, and descriptions therefor are omitted. Referring to FIG. 5, an area discriminating section 40 judges whether each target pixel of multi-value image data belongs to a character area or a photograph area, generates an area flag F representative of a judgment result, and supplies it to the image processing unit 2 and a block area discriminating section 41. The method of judging whether a target pixel belongs to a character area or a photograph area is known, and hence a description therefor is omitted.

In performing the gradation correction and the spatial frequency characteristic correction on multi-value image data as described above, the image processing unit 2 refers to the area flag F and uses parameters suitable for the kind of area to which each pixel belongs in accordance with the area flag F.

By referring to the area flag F of each pixel, the block area discriminating section 41 determines whether each block of 3×3 dots, for instance, belongs to a character area or a photograph area by decision-by-majority, weighting, or the like. The block area discriminating section 41 then generates an area flag F1 representative of the kind of image for each block, and supplies it to a block switching section 42 and an area flag storing section 43.

The block switching section 42 forwards image data coming from the image processing unit 2 to the binarizing section 32 if the area flag F1 indicates a character area, and to the average calculating section 33 if the flag F1 indicates a photograph area.

The area flag storing section 43 stores area flags F1 on a block-by-block basis, and supplies those to a block switching section 44 at given timing. The storage capacity of the area flag storing section 43 may be that of the two-value data storing section 35 divided by the block size, because the area flag F1 indicates the kind of image on a block-by-block basis.

The block switching section 44 forwards bit-train data as read out from the two-value data storing section 35 to the multi-valuing section 37 or the data reconstructing section 38 in accordance with the area flag F1 that is received from the area flag storing section 43. More specifically, the block switching section 44 directs readout bit-train data to the multi-valuing section 37 when the area flag F1 indicates a character area, and to the data reconstructing section 38 when the area flag F1 indicates a photograph area. Output data of the multi-valuing section 37 and the data reconstructing section 38 are synchronously combined into multi-value image data.

While in the above configuration the area judgment is performed on a block-by-block basis by the block area discriminating section 41, it may be discriminated on a block-by-block basis by the area discriminating section 40 in advance.

Next, a description will be made of the operation of the image processing apparatus having the above configuration. In the area discriminating section 40, multi-value image data outputted from the image input unit 1 is subjected to the judgment of whether each target pixel belongs to a character area or a photograph area. An area flag F1 indicative of a judgment result is supplied to the image processing unit 2 and the block area discriminating section 41.

The image processing unit 2 performs the gradation correction and the spatial frequency characteristic correction on the multi-value image data by using parameters corresponding to the area flag F. That is, parameters for emphasizing edge portions are used for a character area (or a line drawing area), and parameters for smoothing and for making gradations more distinct are used for a photograph area. Resulting multi-value value image data is supplied to the block switching section 42.

By referring to the area flag F of each pixel, the block area discriminating section 41 determines whether each block of the given size belongs to a character area or a photograph area by decision-by-majority, weighting, or the like. The block area discriminating section 41 then generates an area flag F1 representative of the kind of image for each block, and supplies it to the block switching section 42 as well as to the area flag storing section 43 for its storage.

If the area flag F1 indicates a character area, the block switching section 42 directs image data of the target block to the binarizing section 32. If the flag F indicates a photograph area, the block selector section 42 directs image data to the average calculating section 33. This data distribution is performed automatically.

Image data belonging to a character area is converted into two-value image data by the binarizing section 32, and temporarily stored in the two-value data storage section 35. As for image data belonging to a photograph area, as in the case of the first embodiment, an average (representative value) of nine pixel values is calculated for each pixel block of nine pixels in the average calculating section 33, and then allocated by the data arranging section 34 to a 3×3-bit memory block BL of the two-value data storing section 35 as shown in FIG. 4. As a result, one average value X, which is multi-value data, is written to a 3×3-bit memory block BL of the two-value data storing section 35.

The two-value image data and the area flags F1 are respectively read from the two-value data storing section 35 and the area flag storing section 43 by a reading means (not shown) so as to be synchronized with each other on a block-by-block basis, and supplied to the block switching section 44. The block switching section 44 forwards the readout two-value data to the multi-valuing section 37 if the area flag F1 indicates a character area, and to the data reconstructing section 38 if the flag F1 indicates a photograph area.

Thus, two-value image data of a character area is converted into multi-value image data by the multi-valuing section 37 in the manner as described above. Two-value image data of a photograph area is also processed in the manner as described above. That is, in the data reconstructing section 38, an average value X of each image block is reconstructed by the bit rearrangement, and is repeatedly copied until one block (9 (=3×3) pixels) is formed.

Image data of a character area and image data of a photograph area, which are respectively outputted from the multi-valuing section 37 and the data reconstructing section 38, are synchronously combined, and the combined image data is forwarded to the image output unit 4, which in turn outputs the image data in the form of an image by an electrophotographic manner, for instance.

As described above, the image processing apparatus of the second embodiment can process the same image data so as to reproduce character data (or line drawing data) at high resolution and reproduce photograph data (or picture data) with satisfactory gradations.

Modifications (1) Modification to accommodate image-rotation processing

Where image reproduction involves rotation processing, image data is stored into the two-value data storing section 35 after being subjected to rotation processing of 90°, 180°, 270°, or the like. In the character-preferential mode, rotated image data can be obtained if it is read out in the same manner as in the case of not involving rotation processing. However, in the photograph-preferential mode, in which even the arrangement of bits forming an average value X written to each memory block is altered, some proper measure should be taken to rearrange readout bits.

Figure 6:
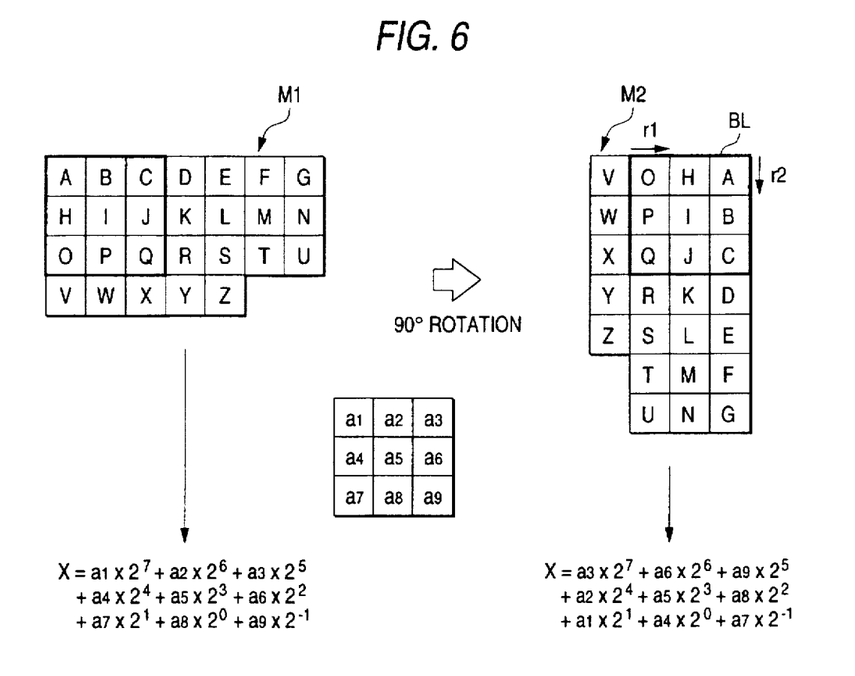
FIG. 6 illustrates the operation of a modification that accommodates rotation processing.

For example, as shown in FIG. 6, when two-value image data that was originally arranged as indicated by M1 is rotated by 90°, resultant image data having an arrangement M2 is stored into the two-value data storing section 35. In the character-preferential mode, reading out the stored image data in the order of . . . , V, O, H, A, . . . results in 90°-rotated two-value image data. However, in the photograph-preferential mode, if the stored image data is read out in the above order, the bits constituting a block BL, for instance, are read out in the order of O, H, A, P, I, . . . , J, C (indicated by arrow r1) and, therefore, does not properly represent an average value X. To avoid this, the readout bit train needs to be rearranged into a bit train having a new order of A, B, C, H, I, . . . , P, Q (indicated by arrow r2) in the case of block BL.

When no rotation processing is carried out, the relationship between the average value X and the bit values $a_1$ to $a_9$ of a memory block is given by Equation (2).

$$X=a_1\times2^7+a_2\times2^6+a_3\times2^5+a_4\times2^4+a_5\times2^3+a_6\times2^2+a_7\times2^1+a_8\times2^0+a_9\times2^{-1}(2)$$

On the other hand, when image data is rotated by 90°, the relationship between the average value X and the bit values of a memory block is given by Equation (3).

$$X=a_3\times2^7+a_6\times2^6+a_9\times2^5+a_2\times2^4+a_5\times2^3+a_8\times2^2+a_1\times2^1+a_4\times2^0+a_7\times2(3)$$

Where the rotation processing is carried out after image data is read out from the two-value data storing section 35 rather than before it is written thereto, after the rotation a bit train corresponding to block BL assumes an order of C, J, Q, B, I, . . . , H, O. Therefore, it is necessary to rearrange this bit train into a bit train having a new order of A, B, C, H, I, . . . , P, Q in the same manner as in the above example.

(2) Modification to accommodate an image containing both characters and a photograph.

The method of reproducing an image containing both characters and a photograph (or picture) is not limited to that of the second embodiment, in which discrimination between character data and photograph data is performed by the image processing. For example, discrimination information indicating the kind of image data, i.e., character data or photograph (picture) data may be attached to image data for each given region or block, and switching between the character-preferential mode and the photograph-preferential mode may be made in accordance with a result of reference to the discrimination information.

This modification, like the second embodiment, can process the same image data so as to reproduce character data at high resolution and reproduce photograph data (or picture data) with satisfactory gradations.

Figure 7A:
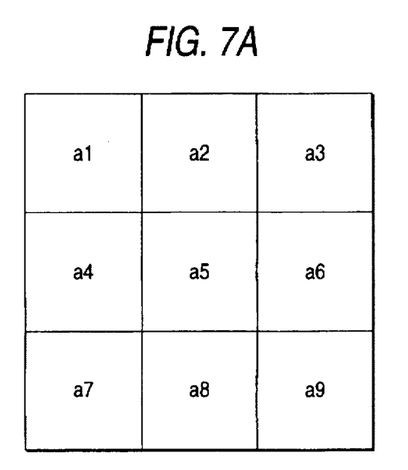
FIGS. 7A and 7B illustrates the operation of a modification in which each memory block stores control information.

(3) Modification having control information stored in each memory block.

Where the average value X is expressed by 9 bits, all the 3×3 bits of the memory block of the two-value data storing section 35 are used as shown in FIG. 7A. In contrast, where the average value X is expressed by 8 bits, i.e., 256 gradation levels, In the case of FIG. 7(b), one bit of the memory block is left unused to express the average value X. Therefore, this residual one bit may be used for block-basis control information such as a flag value for controlling an area edit operation.

Figure 7B:
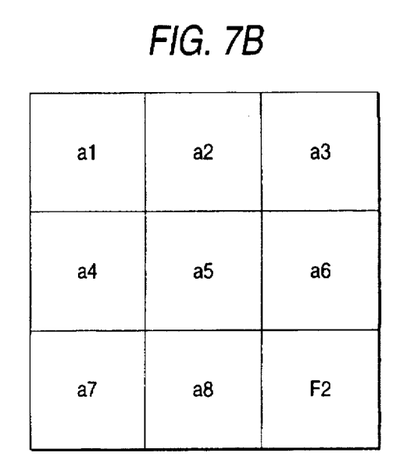

Examples of the area edit operation are trimming, negative/positive inversion, and coloring that are performed on an image area designated by a user with a marker, for instance. To realize an area edit operation, it is necessary to store a designated area. To this end, as described above, one bit of the memory block is reserved to store a designated area flag F2. For example, it is predetermined that a block whose flag F2 is "0" belongs to a designated area, and a block whose flag F2 is "1" does not belong to the designated area. In this case, since the position of a designated area is determined on a block-by-block basis, the positional accuracy is worse than in a case where the position of a designated area is determined on a pixel-by-pixel basis. However, this is not problematic, because usually high positional accuracy is not required in the area designation for an edit operation.

(4) Other Modifications

In the above-mentioned embodiments, the average value is used for the representative value of a pixel block. Alternatively, the representative value may be calculated, for instance, by linear interpolation, or weighted averaging in which pixel values multiplied by different coefficients are averaged.

The size of a pixel block is not limited to 3×3 dots, but may be determined as desired, for instance, in accordance with a desired number of gradation levels. For example, it may be 2×2 dots or 2×3 dots.

Even where processing other than the rotation processing of modification (1), such as mirror image processing, is carried out, the undesired situation that a readout bit train does not properly represent an average value X can be avoided by controlling the order of referencing the bits of each memory block.

The invention is not limited to the processing between two-value and multi-value image data, but may be applicable to a case where the two-value data storing section 35 is replaced by a storage device that stores M-bit-value image data (M: arbitrary integer not less than 2). In this case, the number p of bits of the average (representative value) calculated by the average calculating section 33 is between 2 and m×n×M if it is assumed that input multi-value image data is divided into pixel blocks each consisting of m×n pixels. The data allocating section 34 stores an average value of p bits into a memory block consisting of m×n pixels of the storage device.

As seen from the foregoing description, according to the invention, a representative value of each pixel block of N-bit-value image data is stored in the storing means for M-bit-value image data (M≦N), and N-bit-value image data is reconstructed by using the representative values of the pixel blocks that are read out from the storing means. Therefore, a halftone image can be reproduced smoothly while the storage area is used efficiently (the storage area is shared between the M-bit-valuing processing system and the block processing system).

It becomes possible to switch between the reproduction mode in which preference is given to the resolution over the number of gradation levels and the reproduction mode in which the preference is given to the number of gradation levels over the resolution in accordance with the nature of image (character image or photograph image). Even if a single image contains a character portion, a photograph portion, and the like, switching between the above two modes can be done automatically.

Further, even where the image reproduction processing includes edit processing such as rotation processing, there can be prevented an event that a bit train as read out from the storing means does not properly mean a representative value. Where the pixel block and the memory block is a square matrix, rotation processing can be dealt with more easily.

What is claimed is:

1. An image processing apparatus, comprising:

block processing means for dividing image data expressed in N bits (2≦N) into pixel blocks, each comprising m×n pixels (2≦m, 1≦n), calculating a representative value of pixel values that constitute each of the pixel blocks, by adding the pixel values in respective pixel blocks and dividing the added pixel value by m×n, and outputting the representative value in a form of bit-train data of p bits (2≦p≦m×n×M);

storing means for storing image data expressed in M bits (M<N);

block allocating means for imaginarily dividing a storage area of the storing means into memory blocks each comprising m×n pixels, allocating the bit-train data of p bits of the representative value to bits that constitute each of the memory blocks, and outputting resulting bit-train data;

writing means for writing the bit-train data that is outputted from the block allocating means to the storing means;

reading means for sequentially reading M-bit-value data from the storing means, and outputting the resulting bit-train data; and block reconstructing means for reconstructing p-bit-value image data of m×n representative values having the same value from the bit-train data outputted from the reading means, wherein in accordance with image edit processing including rotation processing, the block allocating means alters a bit arrangement order when allocating the bit-train data of p bits to each of the memory blocks, or the block reconstructing means alters a bit arrangement order when reconstructing the p-bit-value image data from the bit-train data outputted from the reading means.

2. The image processing apparatus according to claim 1, wherein the block processing means calculates, as the representative value, an average of the pixel values of each of the pixel blocks.

3. The image processing apparatus according to claim 1, wherein m is equal to n (2≦m).

4. The image processing apparatus according to claim 1, wherein M is 1.

5. An image processing apparatus, comprising:

block processing means for dividing image data expressed in N bits (2≦N) into pixel blocks, each comprising m×n pixels (2≦m, 1≦n), calculating a representative value of pixel values that constitute each of the pixel blocks, by adding the pixel values in respective pixel blocks and dividing the added pixel value by m×n, and outputting the representative value in a form of bit-train data of p bits (2≦p≦m×n×M);

storing means for storing image data expressed in M bits (M<N);

block allocating means for imaginarily dividing a storage area of the storing means into memory blocks each comprising m×n pixels, allocating the bit-train data of p bits of the representative value to bits that constitute each of the memory blocks, and outputting resulting bit-train data;

writing means for writing the bit-train data that is outputted from the block allocating means to the storing means;

reading means for sequentially reading M-bit-value data from the storing means, and outputting the resulting bit-train data;

block reconstructing means for reconstructing p-bit-value image data of m×n representative values having the same value from the bit-train data outputted from the reading means;

an M-bit-valuing processing system for converting the image data expressed into N bits into image data expressed in M bits, storing the resulting M-bit-value image data into the storing means, and reconstructing image data from the M-bit-value image data read out from the storing means; and mode switching means for switching between the M-bit-valuing processing system and a block processing system comprising the block processing means, the block allocating means, and the block reconstructing means, wherein the storing means is shared between the M-bit-valuing processing system and the block processing system.

6. The image processing apparatus according to claim 5, wherein the image processing apparatus receives image data having discrimination information attached thereto for discrimination between a character area or a halftone area within a single image, and wherein the mode switching means switches between the M-bit-valuing processing system and the block processing system in accordance with the discrimination information so that the M-bit-valuing processing system processes an image data portion of the character area, and the block processing system processes an image data portion of the halftone area.

7. An image processing apparatus, comprising:

block processing means for dividing image data expressed in N bits ($2 \leq N$) into pixel blocks, each comprising m×n pixels ($2 \leq m$, $1 \leq n$), calculating a representative value of pixel values that constitute each of the pixel blocks, by adding the pixel values in respective pixel blocks and dividing the added pixel value by m×n, and outputting the representative value in a form of bit-train data of p bits ($2 \leq p \leq m \times n \times M$);

storing means for storing image data expressed in M bits (M<N);

block allocating means for imaginarily dividing a storage area of the storing means into memory blocks each comprising m×n pixels, allocating the bit-train data of p bits of the representative value to bits that constitute each of the memory blocks, and outputting resulting bit-train data;

writing means for writing the bit-train data that is outputted from the block allocating means to the storing means;

reading means for sequentially reading M-bit-value data from the storing means, and outputting the resulting bit-train data;

block reconstructing means for reconstructing p-bit-value image data of m×n representative values having the same value from the bit-train data outputted from the reading means, wherein control information for image processing is stored in an unused bit of the bits that constitute each of the memory blocks, the unused bit not being used for storage of the bit-train data of p bits.

8. An image processing apparatus, comprising:

block processing means for dividing image data expressed in N bits ($2 \leq N$) into pixel blocks, each comprising m×n pixels ($2 \leq m$, $1 \leq n$), calculating a representative value of pixel values that constitute each of the pixel blocks, by adding the pixel values in respective pixel blocks and dividing the added pixel value by m×n, and outputting the representative value in a form of bit-train data of p bits ($2 \leq p23$ m×n×M);

storing means for storing image data expressed in M bits (M<N);

block allocating means for imaginarily dividing a storage area of the storing means into memory blocks each comprising m×n pixels, allocating the bit-train data of p bits of the representative value to bits that constitute each of the memory blocks, and outputting resulting bit-train data;

writing means for writing the bit-train data that is outputted from the block allocating means to the storing means;

reading means for sequentially reading M-bit-value data from the storing means, and outputting the resulting bit-train data;

block reconstructing means for reconstructing p-bit-value image data of m×n representative values having the same value from the bit-train data outputted from the reading means;

an M-bit-valuing processing system for converting the image data expressed in N bits into image data expressed in M bits, storing resulting M-bit-value image data into the storing means, and reconstructing image data from the M-bit-value image data read out from the storing means;

discrimination information generating means for generating discrimination information for discrimination between a character area and a halftone area; and mode switching means for switching, in accordance with the discrimination information, between the M-bit-valuing processing system and a block processing system comprising the block processing means, the block allocating means, and the block reconstructing means.

9. The image processing apparatus according to claim 8, wherein the M-bit-valuing processing system processes an image data portion of the character area, and the block processing system processes an image data portion of the halftone area.

* * * * *